(12) United States Patent
Leabman et al.

(10) Patent No.: US 9,450,449 B1
(45) Date of Patent: Sep. 20, 2016

(54) ANTENNA ARRANGEMENT FOR POCKET-FORMING

(71) Applicant: ENERGOUS CORPORATION, San Jose, CA (US)

(72) Inventors: Michael A. Leabman, San Ramon, CA (US); Gregory Scott Brewer, Livermore, CA (US)

(73) Assignee: Energous Corporation, San Jose, CA (US)

( * ) Notice: Subject to any disclaimer, the term of this patent is extended or adjusted under 35 U.S.C. 154(b) by 0 days.

(21) Appl. No.: 14/586,314

(22) Filed: Dec. 30, 2014

Related U.S. Application Data

(63) Continuation-in-part of application No. 13/908,839, filed on Jun. 3, 2013, now abandoned, and a continuation-in-part of application No. 13/891,399, filed on May 10, 2013, and a continuation-in-part of application No. 13/891,430, filed on May 10, 2013, and a continuation-in-part of application No. 13/891,445, filed on May 10, 2013.

(60) Provisional application No. 61/720,798, filed on Oct. 31, 2012, provisional application No. 61/677,706, filed on Jul. 31, 2012, provisional application No. 61/668,799, filed on Jul. 6, 2012.

(51) Int. Cl.
| | |
|---|---|
| *H01F 27/42* | (2006.01) |
| *H01F 37/00* | (2006.01) |
| *H01F 38/00* | (2006.01) |
| *H02J 7/02* | (2016.01) |
| *H02J 17/00* | (2006.01) |

(52) U.S. Cl.
CPC .............. *H02J 7/025* (2013.01); *H02J 17/00* (2013.01)

(58) Field of Classification Search
USPC .......................................... 307/104; 320/108
See application file for complete search history.

(56) References Cited

U.S. PATENT DOCUMENTS

| | | | |
|---|---|---|---|
| 4,360,741 A | 11/1982 | Fitzsimmons et al. | |
| 5,712,642 A * | 1/1998 | Hulderman | H01Q 3/42 342/157 |

(Continued)

FOREIGN PATENT DOCUMENTS

| | | |
|---|---|---|
| EP | 2545635 A2 | 1/2013 |
| KR | 1020130026977 A | 3/2013 |

(Continued)

OTHER PUBLICATIONS

International Search Report dated Oct. 10, 2014, corresponding to International Patent Application No. PCT/US2014/040648.

(Continued)

*Primary Examiner* — Rexford Barnie
*Assistant Examiner* — Xuan Ly
(74) *Attorney, Agent, or Firm* — Eric L. Sophir; Dentons US LLP

(57) ABSTRACT

The present disclosure describes a plurality of antenna arrangements that may be suitable for wireless power transmission based on single or multiple pocket-forming. Single or multiple pocket-forming may include one transmitter and at least one or more receivers, being the transmitter the source of energy and the receiver the device that is desired to charge or power. 'The antenna arrangements may vary in size and geometry, and may operate as a single array, pair array, quad arrays or any other suitable arrangement, which may be designed in accordance with the desired application.

20 Claims, 4 Drawing Sheets

(56) References Cited

U.S. PATENT DOCUMENTS

| | | |
|---|---|---|
| 5,936,527 A | 8/1999 | Isaacman et al. |
| 5,982,139 A | 11/1999 | Parise |
| 6,127,799 A | 10/2000 | Krishnan |
| 6,127,942 A | 10/2000 | Welle |
| 6,289,237 B1 | 9/2001 | Mickle et al. |
| 6,615,074 B2 | 9/2003 | Mickle et al. |
| 6,798,716 B1 | 9/2004 | Charych |
| 6,856,291 B2 | 2/2005 | Mickle et al. |
| 6,960,968 B2 | 11/2005 | Odendaal et al. |
| 7,003,350 B2 | 2/2006 | Denker et al. |
| 7,027,311 B2 | 4/2006 | Vanderelli et al. |
| 7,068,991 B2 | 6/2006 | Parise |
| 7,191,013 B1 | 3/2007 | Miranda et al. |
| 7,403,803 B2 | 7/2008 | Mickle et al. |
| 7,451,839 B2 | 11/2008 | Perlman |
| 7,639,994 B2 | 12/2009 | Greene et al. |
| 7,643,312 B2 | 1/2010 | Vanderelli et al. |
| 7,786,419 B2 | 8/2010 | Hyde et al. |
| 7,812,771 B2 | 10/2010 | Greene et al. |
| 7,844,306 B2 | 11/2010 | Shearer et al. |
| 7,868,482 B2 | 1/2011 | Greene et al. |
| 7,898,105 B2 | 3/2011 | Greene et al. |
| 7,925,308 B2 | 4/2011 | Greene et al. |
| 8,099,140 B2 | 1/2012 | Arai |
| 8,115,448 B2 | 2/2012 | John |
| 8,159,090 B2 | 4/2012 | Greene et al. |
| 8,159,364 B2 | 4/2012 | Zeine |
| 8,180,286 B2 | 5/2012 | Yamasuge |
| 8,362,745 B2 | 1/2013 | Tinaphong |
| 8,380,255 B2 | 2/2013 | Shearer et al. |
| 8,410,953 B2 | 4/2013 | Zeine |
| 8,432,062 B2 | 4/2013 | Greene et al. |
| 8,432,071 B2 | 4/2013 | Huang et al. |
| 8,446,248 B2 | 5/2013 | Zeine |
| 8,447,234 B2 | 5/2013 | Cook et al. |
| 8,461,817 B2 | 6/2013 | Martin et al. |
| 8,552,597 B2 | 10/2013 | Song et al. |
| 8,558,661 B2 | 10/2013 | Zeine |
| 8,621,245 B2 | 12/2013 | Shearer et al. |
| 8,712,355 B2 | 4/2014 | Black et al. |
| 8,854,176 B2 | 10/2014 | Zeine |
| 8,897,770 B1 | 11/2014 | Frolov et al. |
| 9,000,616 B2 | 4/2015 | Greene et al. |
| 9,021,277 B2 | 4/2015 | Shearer et al. |
| 9,124,125 B2 | 9/2015 | Leabman et al. |
| 2003/0179573 A1 | 9/2003 | Chun |
| 2005/0007276 A1 | 1/2005 | Barrick et al. |
| 2005/0117660 A1 | 6/2005 | Vialle et al. |
| 2006/0160517 A1 | 7/2006 | Yoon |
| 2006/0238365 A1 | 10/2006 | Vecchione et al. |
| 2006/0284593 A1 | 12/2006 | Nagy et al. |
| 2007/0007821 A1 | 1/2007 | Rossetti |
| 2007/0060185 A1 | 3/2007 | Simon et al. |
| 2007/0178945 A1* | 8/2007 | Cook .................. H02J 17/00 455/572 |
| 2007/0191075 A1 | 8/2007 | Greene et al. |
| 2008/0062062 A1* | 3/2008 | Borau .................. H01Q 1/246 343/844 |
| 2008/0074324 A1* | 3/2008 | Puzella ................ H01Q 21/22 343/700 MS |
| 2008/0204350 A1* | 8/2008 | Tam .................. H01Q 21/065 343/872 |
| 2008/0309452 A1 | 12/2008 | Zeine |
| 2009/0067208 A1 | 3/2009 | Martin et al. |
| 2009/0108679 A1 | 4/2009 | Porwal |
| 2009/0200985 A1 | 8/2009 | Zane et al. |
| 2009/0243397 A1 | 10/2009 | Cook et al. |
| 2009/0281678 A1 | 11/2009 | Wakamatsu |
| 2009/0284083 A1 | 11/2009 | Karalis et al. |
| 2010/0027379 A1 | 2/2010 | Saulnier et al. |
| 2010/0033021 A1 | 2/2010 | Bennett |
| 2010/0033390 A1 | 2/2010 | Alamouti et al. |
| 2010/0194206 A1 | 8/2010 | Burdo et al. |
| 2010/0201201 A1 | 8/2010 | Mobarhan et al. |
| 2010/0244576 A1 | 9/2010 | Hillan et al. |
| 2010/0277003 A1 | 11/2010 | Von Novak et al. |
| 2010/0295372 A1 | 11/2010 | Hyde et al. |
| 2010/0309079 A1 | 12/2010 | Rofougaran et al. |
| 2010/0315045 A1* | 12/2010 | Zeine .................. H02J 7/025 320/137 |
| 2011/0028114 A1 | 2/2011 | Kerselaers |
| 2011/0074342 A1 | 3/2011 | MacLaughlin |
| 2011/0115303 A1 | 5/2011 | Baarman et al. |
| 2011/0181120 A1 | 7/2011 | Liu et al. |
| 2011/0199046 A1 | 8/2011 | Tsai et al. |
| 2011/0254503 A1 | 10/2011 | Widmer et al. |
| 2011/0278941 A1 | 11/2011 | Krishna et al. |
| 2011/0281535 A1 | 11/2011 | Low et al. |
| 2011/0282415 A1 | 11/2011 | Eckhoff et al. |
| 2012/0074891 A1 | 3/2012 | Anderson et al. |
| 2012/0080957 A1 | 4/2012 | Cooper et al. |
| 2012/0103562 A1 | 5/2012 | Alexander |
| 2012/0146576 A1 | 6/2012 | Partovi |
| 2012/0157019 A1 | 6/2012 | Li |
| 2012/0193999 A1 | 8/2012 | Zeine |
| 2012/0248891 A1 | 10/2012 | Drennen |
| 2012/0249051 A1 | 10/2012 | Son et al. |
| 2012/0262002 A1 | 10/2012 | Widmer et al. |
| 2012/0274154 A1 | 11/2012 | DeLuca |
| 2012/0293021 A1 | 11/2012 | Teggatz et al. |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0326660 A1* | 12/2012 | Lu ...................... H02J 17/00 320/108 |
| 2013/0024059 A1 | 1/2013 | Miller et al. |
| 2013/0026982 A1 | 1/2013 | Rothenbaum |
| 2013/0083774 A1* | 4/2013 | Son .................. H04W 36/0055 370/331 |
| 2013/0200064 A1 | 8/2013 | Alexander |
| 2013/0207477 A1 | 8/2013 | Nam et al. |
| 2013/0207604 A1 | 8/2013 | Zeine |
| 2013/0241468 A1 | 9/2013 | Moshfeghi |
| 2013/0241474 A1 | 9/2013 | Moshfeghi |
| 2013/0268782 A1 | 10/2013 | Tam et al. |
| 2014/0008992 A1 | 1/2014 | Leabman |
| 2014/0008993 A1 | 1/2014 | Leabman |
| 2014/0009108 A1 | 1/2014 | Leabman |
| 2014/0035524 A1 | 2/2014 | Zeine |
| 2014/0049422 A1 | 2/2014 | Von Novak et al. |
| 2014/0062395 A1 | 3/2014 | Kwon et al. |
| 2014/0086125 A1 | 3/2014 | Polo et al. |
| 2014/0217967 A1 | 8/2014 | Zeine et al. |
| 2014/0241231 A1 | 8/2014 | Zeine |
| 2014/0265725 A1 | 9/2014 | Angle et al. |
| 2014/0265727 A1 | 9/2014 | Berte |
| 2014/0265943 A1 | 9/2014 | Angle et al. |
| 2014/0281655 A1 | 9/2014 | Angle et al. |
| 2014/0354063 A1 | 12/2014 | Leabman et al. |
| 2014/0354221 A1 | 12/2014 | Leabman et al. |
| 2014/0355718 A1 | 12/2014 | Guan et al. |
| 2014/0357309 A1 | 12/2014 | Leabman et al. |
| 2014/0368048 A1 | 12/2014 | Leabman et al. |
| 2014/0375253 A1 | 12/2014 | Leabman et al. |
| 2014/0375255 A1 | 12/2014 | Leabman et al. |
| 2015/0015194 A1 | 1/2015 | Leabman et al. |
| 2015/0015195 A1 | 1/2015 | Leabman et al. |
| 2015/0022010 A1 | 1/2015 | Leabman et al. |
| 2015/0102681 A1 | 4/2015 | Leabman et al. |
| 2015/0102769 A1 | 4/2015 | Leabman et al. |
| 2015/0130285 A1 | 5/2015 | Leabman et al. |
| 2015/0199665 A1 | 7/2015 | Chu |

FOREIGN PATENT DOCUMENTS

| | | |
|---|---|---|
| WO | 9952173 A2 | 10/1999 |
| WO | 2003091943 A1 | 11/2003 |
| WO | 2004077550 A1 | 9/2004 |
| WO | 2008156571 A2 | 12/2008 |
| WO | 2010022181 A1 | 2/2010 |
| WO | 2010138994 A1 | 12/2010 |

(56) References Cited

FOREIGN PATENT DOCUMENTS

| WO | 2011112022 A2 | 9/2011 |
|---|---|---|
| WO | 2013/031988 A1 | 3/2013 |
| WO | 2013035190 A1 | 3/2013 |
| WO | 2014182788 A2 | 11/2014 |
| WO | 2014182788 A3 | 11/2014 |

OTHER PUBLICATIONS

International Search Report dated Sep. 12, 2014 corresponding to International Patent Application No. PCT/US2014/037072, 3 pages.
International Search Report dated Jan. 27, 2015 corresponding to International Patent Application No. PCT/US2014/037170, 4 pages.
International Search Report dated Oct. 16, 2014 corresponding to International Patent Application No. PCT/US2014/041546, 4 pages.
International Search Report dated Oct. 13, 2014 corresponding to International Patent Application No. PCT/US2014/041534, 4 pages.
International Search Report dated Nov. 12, 2014 corresponding to International Patent Application No. PCT/US2014/046956, 4 pages.
Written Opinion of the International Searching Authority dated Nov. 12, 2014 corresponding to International Patent Application No. PCT/US2014/046956, 6 pages.
Notification of Transmittal of the International Search Report and the Written Opinion of the International Searching Authority, or the Declaration issued in International Application No. PCT/US15/67245 with Date of mailing Mar. 17, 2016, 9 pages.
Notification of Transmittal of The International Search Report and the Written Opinion of the International Searching Authority, Or The Declaration issued in International Application No. PCT/US15/67243 with Date of mailing Mar. 10, 2016, 9 pages.
Singh, V. et al., "Wireless Power Transfer Using Metamaterial Bonded Microstrip Antenna for Smart Grid WSN," In Fourth International Conference on Advances in Computing and Communications (ICACC), Aug. 27-29, 2014, Abstract, p. 299.
International Search Report issued in International Application No. PCT/US2014/037109 with Date of mailing Apr. 8, 2016, 4 pages.
Notification of Transmittal of The International Search Report and The Written Opinion of the International Searching Authority, Or The Declaration issued in International Application No. PCT/US15/67242 with Date of mailing Mar. 16, 2016.
International Search Report and Written Opinion mailed Dec. 22, 2014 in International Application No. PCT/US2014/055195, 12 pages.
International Search Report and Written Opinion of the International Searching Authority mailed Mar. 30, 2016 in International Application No. PCT/US15/67250, 12 pages.
Notification of Transmittal of the International Search Report and The Written Opinion of the International Searching Authority, or the Declaration issued in International Application No. PCT/US15/67246, mailed May 11, 2016, 18 pages.

* cited by examiner

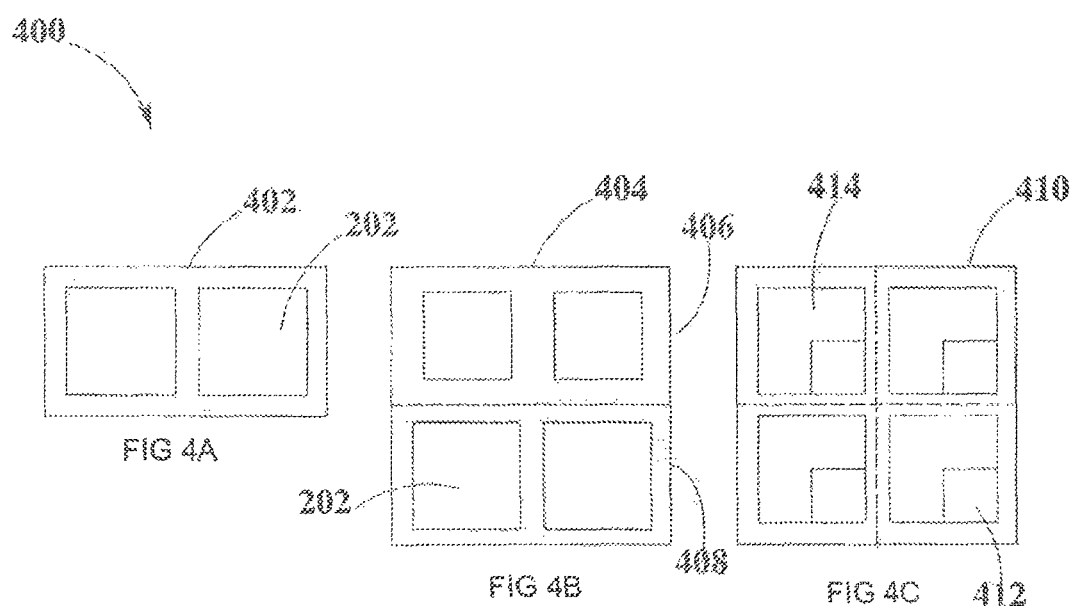

ANTENNA ARRANGEMENT FOR POCKET-FORMING

CROSS-REFERENCE TO RELATED APPLICATIONS

This application is a continuation-in-part of U.S. patent application Ser. No. 13/908,839, filed on Jun. 3, 2013; U.S. patent application Ser. No. 13/891,399, filed May 10, 2013, which claims priority to U.S. Patent Application Ser. No. 61/720,798, filed Oct. 31, 2012, U.S. Patent Application Ser. No. 61/677,706, filed Jul. 31, 2012, U.S. Patent Application Ser. No. 61/668,799, filed Jul. 6, 2012; U.S. patent application Ser. No. 13/891,430, filed May 10, 2013, which claims priority to U.S. Patent Application Ser. No. 61/720,798, filed Oct. 31, 2012, U.S. Patent Application Ser. No. 61/677,706, filed Jul. 31, 2012, U.S. Patent Application Ser. No. 61/668, 799, filed Jul. 6, 2012; and U.S. patent application Ser. No. 13/891,445, filed May 10, 2013, which claims priority to U.S. Patent Application Ser. No. 61/720,798, filed Oct. 31, 2012, U.S. Patent Application Ser. No. 61/677,706, filed Jul. 31, 2012, U.S. Patent Application Ser. No. 61/668,799, filed Jul. 6, 2012; all of which are herein fully incorporated by reference in their entirety.

This application relates to U.S. patent application Ser. No. 13/925,469, filed on Jun. 24, 2013; U.S. patent application Ser. No. 13/946,082, filed on Jul. 19, 2013; U.S. patent application Ser. No. 13/960,560, filed on Aug. 6, 2013; U.S. Non-Provisional patent application Ser. No. 14/583,625, filed Dec. 27, 2014, entitled "Receivers for Wireless Power Transmission," U.S. Non-Provisional patent application Ser. No. 14/583,630, filed Dec. 27, 2014, entitled "Methodology for Pocket-Forming," U.S. Non-Provisional patent application Ser. No. 14/583,634, filed Dec. 27, 2014, entitled "Transmitters for Wireless Power Transmission," U.S. Non-Provisional patent application Ser. No. 14/583,640, filed Dec. 27, 2014, entitled "Methodology for Multiple Pocket-Forming," U.S. Non-Provisional patent application Ser. No. 14/583,641, filed Dec. 27, 2014, entitled "Wireless Power Transmission with Selective Range," U.S. Non-Provisional patent application Ser. No. 14/583,643, filed Dec. 27, 2014, entitled "Method for 3 Dimensional Pocket-Forming," all of which are incorporated herein by reference in their entirety.

FIELD OF INVENTION

The present disclosure relates to wireless power transmission, and more particularly to the antenna arrangements for wireless power transmission based on pocket-forming.

BACKGROUND OF THE INVENTION

Portable electronic devices such as smart phones, tablets, notebooks and others, have become an everyday need in the ways we communicate and interact with others. The frequent use of these devices may require a significant amount of power, which may easily deplete the batteries attached to these devices. Therefore, a user is frequently needed to plug in the device to a power source, and recharge such device. This may be inconvenient and troublesome if the user forgets to plug in or otherwise charge a device, the device may run out of power and be of no use to the user until the user is again able to charge the device.

There are many approaches in the literature that have tried to reduce the impact of the changing needs of portable electronic devices. In some cases the devices have rechargeable batteries. However, the aforementioned approach requires a user to carry around extra batteries, and also make sure that the extra set of batteries is charged. Solar-powered battery chargers are also known, however, solar cells are expensive, and a large array of solar cells may be required to charge a battery of any significant capacity. Other approaches involve a mat or pad that allows to charge a device without physically connecting a plug of the device, by using electromagnetic signals. In this case, the device still requires to be placed in a certain location for a period of time in order to be charged. Assuming a single source power transmission of electro-magnetic (EM) signal, an EM signal gets reduced by a factor of $1/r^2$ in magnitude over a distance r. Thus, the received power at a large distance from the EM transmitter is a small fraction of the power transmitted.

To increase the power of the received signal, the transmission power would have to be boosted. Assuming that the transmitted signal has an efficient reception at three centimeters from the EM transmitter, receiving the same signal power over a useful distance of three meters would entail boosting the transmitted power by 10,000×. Such power transmission is wasteful, as most of the energy would be transmitted and not received by the intended devices, it could be hazardous to living tissue, it would most likely interfere with most electronic devices in the immediate vicinity, and it may be dissipated as heat.

In yet another approach such as directional power transmission, it would generally require knowing the location of the device to be able to point the signal in the right direction to enhance the power transmission efficiency. However, even when the device is located, efficient transmission is not guaranteed due to reflections and interference of objects in the path or vicinity of the receiving device.

Therefore, a wireless power transmission method solving the aforementioned problems is desired.

SUMMARY OF THE INVENTION

The present disclosure provides a plurality of antenna arrangements that may be suitable for the formation of a single or multiple pockets of energy onto one or more devices. Pockets of energy may be formed by using at least one transmitter and one or more receivers. In one or more aspects of the present disclosure, the transmitter may include a housing having at least two antenna elements, at least one radio frequency integrated circuit (RFIC), and at least one digital signal processor or micro-controller which may be connected to a power source. The housing may also include a communications component.

In another aspect of the present disclosure, the transmitter may include a flat panel antenna array having a N number of antenna elements; where gain requirements for power transmitting may be from 64 to 256 antenna elements being distributed in an equally spaced grid. However, the number and type of antenna elements may vary in relation with the desired range and power transmission capability on transmitter, the more antenna elements, the wider range and higher power transmission capability. Suitable antenna elements may be flat antennas, patch antennas, and dipole antennas among others. Alternate configurations may also be possible including circular patterns or polygon arrangements.

In yet another aspect of the present disclosure, the antenna elements may operate in single array, pair array, quad array and any other suitable arrangement, which may be designed in accordance with the desired application. In one embodiment, a single array may operate only in one frequency band such as 5.8 GHz. In another embodiment, a pair array may be divided so as to use ½ of the antenna elements to operate at one frequency and the other ½ to operate at another frequency. These frequencies may alternate one another among 900 MHz, 2.4 Ghz, and 5.8 Ghz, as these frequency bands may comply with the FCC regulations, part 18. In yet another embodiment, a quad array may have 4 antenna elements. In the quad array, each antenna element may be virtually divided in two or more patches to operate at different frequencies. By virtually dividing the antenna elements, power losses during wireless power transmission may be avoided.

The different antenna arrangements described in the present disclosure may improve the capability and efficiency of the transmitter to provide wireless power transmission to one or more devices that may operate at different frequency bands.

These and other advantages of the present disclosure may be evident to those skilled in the art, or may become evident upon reading the detailed description of the prefer embodiment, as shown in the accompanying drawings.

BRIEF DESCRIPTION OF THE DRAWINGS

Embodiments of the present disclosure are described by way of example with reference to the accompanying figures, which are schematic and may not be drawn to scale. Unless indicated as representing prior art, the figures represent aspects of the present disclosure. The main features and advantages of the present disclosure will be better understood with the following descriptions, claims, and drawings, where:

FIG. 4 shows antenna arrays, according to various embodiments.

DETAILED DESCRIPTION OF THE DRAWINGS

Figure 1:
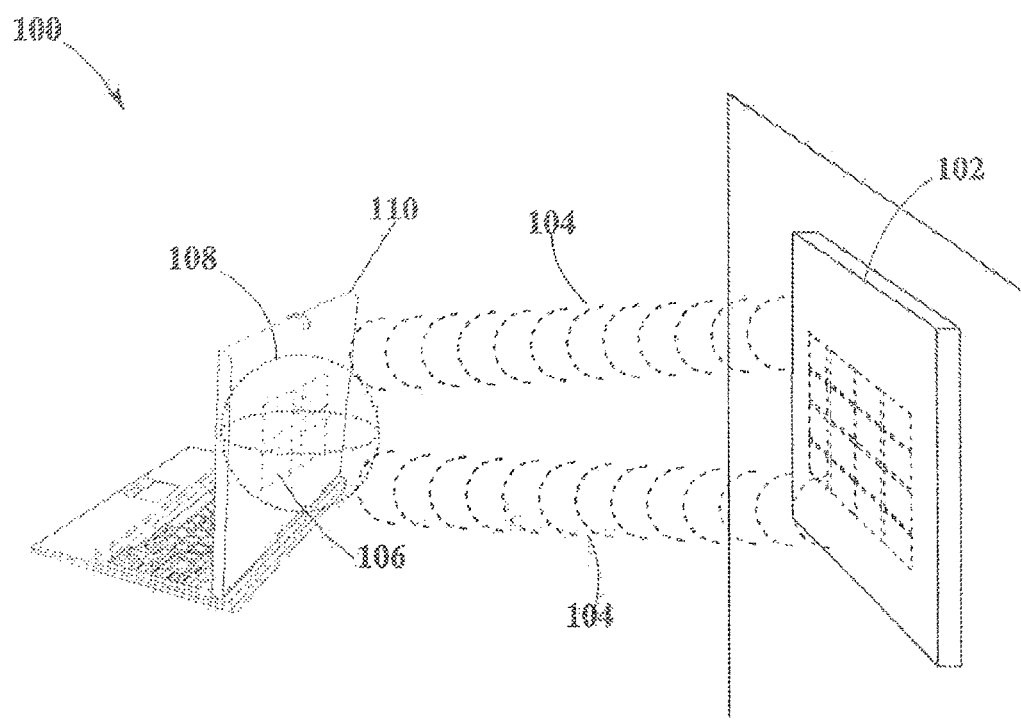
FIG. 1 illustrates a wireless power transmission example situation using pocket-forming.

"Pocket-forming" may refer to generating two or more RF waves which converge in 3-d space, forming controlled constructive and destructive interference patterns.

"Pockets of energy" may refer to areas or regions of space where energy or power may accumulate in the form of constructive interference patterns of RF waves.

"Null-space" may refer to areas or regions of space where pockets of energy do not form because of destructive interference patterns of RF waves.

"Transmitter" may refer to a device, including a chip which may generate two or more RF signals, at least one RF signal being phase shifted and gain adjusted with respect to other RF signals, substantially all of which pass through one or more RF antenna such that focused RF signals are directed to a target.

"Receiver" may refer to a device including at least one antenna element, at least one rectifying circuit and at least one power converter, which may utilize pockets of energy for powering, or charging an electronic device.

"Adaptive pocket-forming" may refer to dynamically adjusting pocket forming to regulate power on one or more targeted receivers.

DESCRIPTION OF THE DRAWINGS

In the following detailed description, reference is made to the accompanying drawings, which form a part hereof. In the drawings, which may not be to scale or to proportion, similar symbols typically identify similar components, unless context dictates otherwise. The illustrative embodiments described in the detailed description, drawings and claims, are not meant to be limiting, Other embodiments may be used and/or and other changes may be made without departing from the spirit or scope of the present disclosure.

FIG. 1 illustrates wireless power transmission 100 using pocket-forming. A transmitter 102 may transmit controlled Radio RF waves 104 which may converge in 3-d space. These Radio frequencies (RF) waves 104 may be controlled through phase and/or relative amplitude adjustments to form constructive and destructive interference patterns (pocket-forming). Pockets of energy 108 may be formed at constructive interference patterns and can be 3-dimensional in shape whereas null-spaces may be generated at destructive interference patterns. A receiver 106 may then utilize pockets of energy 108 produced by pocket-forming for charging or powering an electronic device, for example a laptop computer 110 and thus effectively providing wireless power transmission. In other situations there can be multiple transmitters 102 and/or multiple receivers 106 for powering various electronic equipment for example smartphones, tablets, music players, toys and others at the sane time. In other embodiments, adaptive pocket-forming may be used to regulate power on electronic devices.

Figure 2:
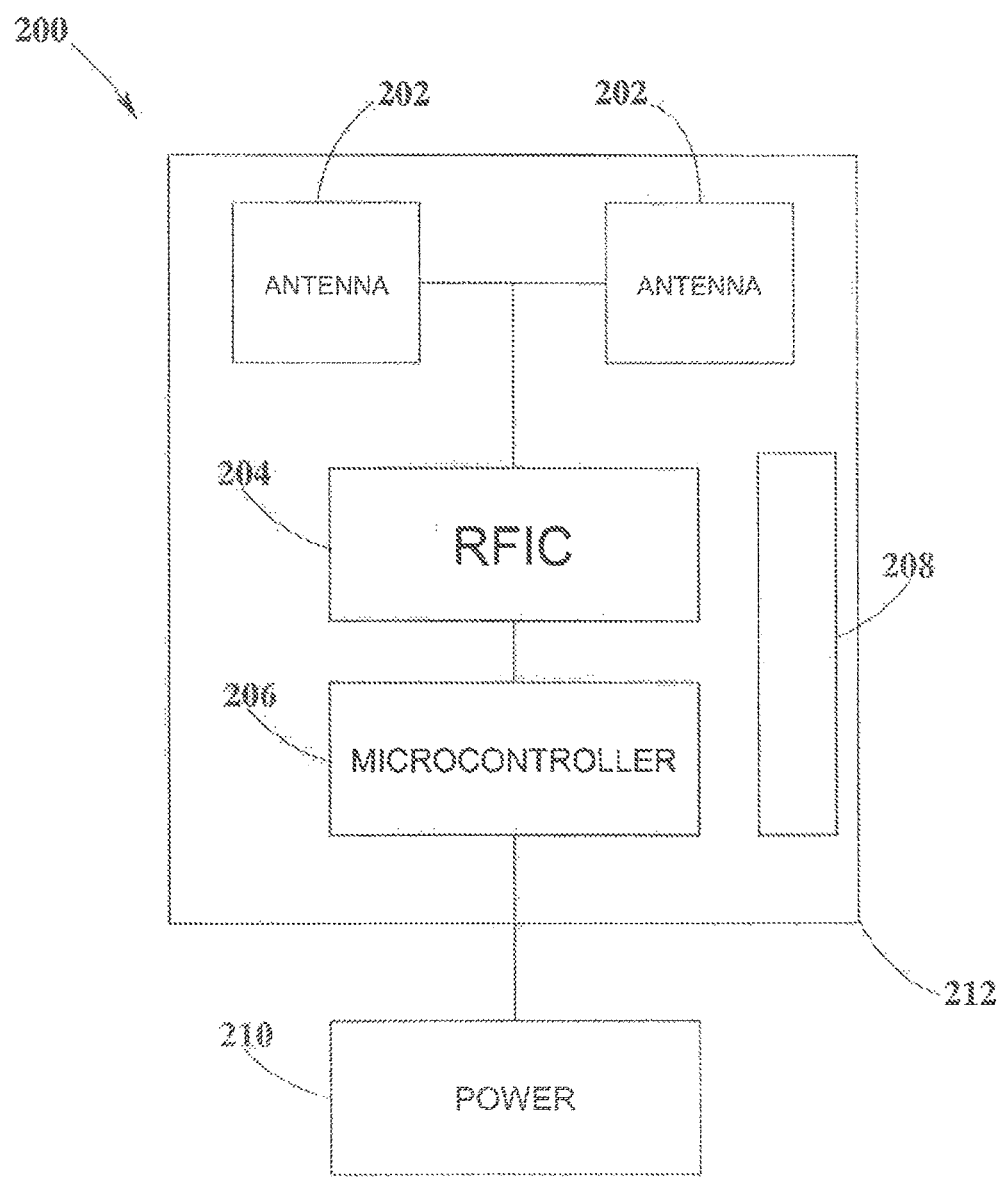
FIG. 2 illustrates a component level embodiment for a transmitter.

FIG. 2 depicts a basic block diagram of a transmitter 200 which may be utilized for wireless power transmission 100. Such transmitter 200 may include one or more antenna elements 202, one or more Radio frequency integrated circuit (RFIC) 204, one or more microcontroller 206, a communication component 208, a power source 210 and a housing 212, which may allocate all the requested components for transmitter 200. Components in transmitter 200 may be manufactured using meta-materials, micro printing of circuits, nano-materials, and the like.

Transmitter 200 may be responsible for the pocket-forming, adaptive pocket-forming and multiple pocket-forming through the use of the components mentioned in the foregoing paragraph. Transmitter 200 may send wireless power transmission to one or more receivers in form of radio signals, such signals may include any radio signal with any frequency or wavelength.

Figure 3:
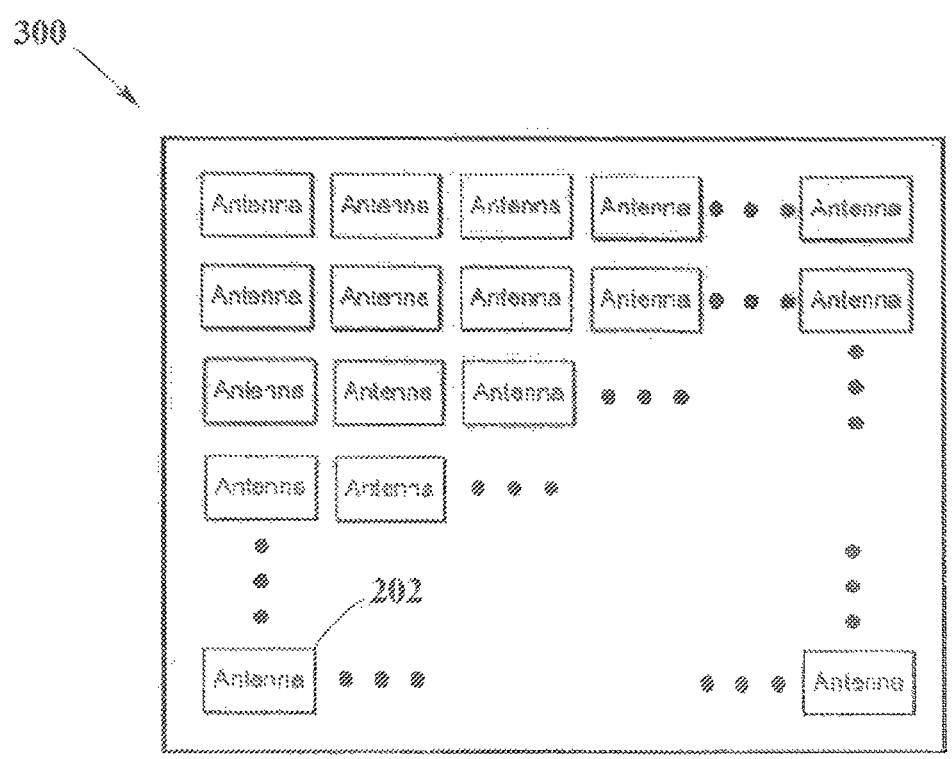
FIG. 3 is an exemplary illustration of a flat panel antenna array that may be used in a transmitter, as the one described in FIG. 2.

FIG. 3 is an exemplary illustration of a flat panel antenna array 300 that may be used in transmitter 200, described in FIG. 2. Flat panel antenna array 300 may then include an N number of antenna elements 202 where gain requirements for power transmitting may be from 64 to 256 antenna elements 202 which may be distributed in an equally spaced grid. In one embodiment, flat panel antenna array 300 may have a 8×8 grid to have a total of 64 antenna elements 202. In another embodiment, flat panel antenna array 300 may have a 16×16 grid to have a total of 256 antenna elements 202. However, the number of antenna elements 202 may vary in relation with the desired range and power transmission capability on transmitter 200, the more antenna elements 202, the wider range and higher power transmission capability. Alternate configurations may also be possible including circular patterns or polygon arrangements.

Flat panel antenna array 300 may also be broken into numerous pieces and distributed across multiple surfaces (multi-faceted).

Antenna elements 202 may include flat antenna elements 202, patch antenna elements 202, dipole antenna elements 202 and any suitable antenna for wireless power transmission. Suitable antenna types may include, for example, patch antennas with heights from about ½ inch to about 6 inches and widths from about ½ inch to about 6 inches. Shape and orientation of antenna elements 202 may vary in dependency of the desired features of transmitter 200, orientation may be flat in X, Y, and Z axis, as well as various orientation types and combinations in three dimensional arrangements. Antenna elements 202 materials may include any suitable material that may allow radio signal transmission with high efficiency, good heat dissipation and the like.

Antenna elements 202 may include suitable antenna types for operating in frequency bands such as 900 MHz, 2.5 GHz or 5.8 GHz as these frequency bands conform to Federal Communications Commission (FCC) regulations part 18 (Industrial, Scientific and Medical equipment). Antenna elements 202 may operate in independent frequencies, allowing a multichannel operation of pocket-forming.

In addition, antenna elements 202 may have at least one polarization or a selection of polarizations. Such polarization may include vertical pole, horizontal pole, circularly polarized, left hand polarized, right hand polarized, or a combination of polarizations. The selection of polarizations may vary in dependency of transmitter 200 characteristics. In addition, antenna elements 202 may be located in various surfaces of transmitter 200.

Antenna elements 202 may operate in single array, pair array, quad array and any other suitable arrangement, which may be designed in accordance with the desired application.

FIG. 4 shows antenna arrays 400 according to various embodiments. Antenna arrays 400 may include suitable antenna types for operating in frequency bands such as 900 MHz, 2.5 GHz, and 5.8 GHz, as these frequency bands may comply with the FCC regulations, part 18.

FIG. 4A shows a single array 402 where all antenna elements 202 may operate at 5.8 Ghz. Thus single array 402 may be used for charging or powering a single device, similar to the embodiment described in FIG. 1. FIG. 4B shows pair array 404, where the top half 406 of antenna elements 202 may operate at 5.8 Ghz and the bottom half 408 may operate at 2.4 Ghz. Pair array 404 may then be used to charge or power, at the same time, two receivers 106 that may operate at different frequency bands such as the ones described above. As seen in FIG. 4B, antenna elements 202 may vary in size according to the antenna type.

FIG. 4C shows a quad array 410 where each antenna element 202 may be virtually divided to avoid power losses during wireless power transmission. In this embodiment, each antenna element 202 may be virtually divided in two antenna elements 202, antenna element 412 and antenna element 414. Antenna element 412 may be used for transmitting in 5.8 GHz frequency band and antenna element 414 may be used for transmitting in 2.4 GHz frequency band. Quad array 410 may then be used in situations where multiple receivers 106 operating at different frequency bands require to be charged or powered.

EXAMPLES

In example #1 a portable electronic device that may operate at 2.4 GHz may be powered or charged. In this example, a transmitter as the one described in FIG. 2, may be used to deliver pockets of energy onto one electronic device, as in FIG. 1. This transmitter may have a single array of 8×8 of flat panel antennas where all the antenna elements may operate in the frequency band of 2.4 GHz. Flat antennas may occupy less volume than other antennas, hence allowing a transmitter to be located at small and thin spaces, such as, walls, mirrors, doors, ceilings and the like. In addition, flat panel antennas may be optimized for operating to long distances into narrow hall of wireless power transmission, such feature may allow operation of portable devices in long areas such as, train stations, bus stations, airports and the like. Furthermore, flat panel antennas of 8×8 may generate smaller pockets of energy than other antennas since its smaller volume, this may reduce losses and may allow more accurate generation of pockets of energy, such accuracy may be employed for charging/powering a variety of portable electronic devices near areas and/or objects which do not require pockets of energy near or over them.

In example #2 two electronic devices that may operate at two different frequency bands may be powered or charged at the same time. In this example, the transmitter as the one described in FIG. 2, may be used to deliver pockets of energy onto two electronic devices. In this example, the transmitter may have a pair array with different type of antennas, flat panel antennas and dipole antennas, where ½ of the array may be formed by flat panel antennas and the other half by dipole antennas, as shown in FIG. 4b. As described in example #1, flat panel antennas may be optimized to radiate power within narrow halls at considerable distances. On the other hand, dipole antennas may be employed for radiating power at nearer distances but covering more area because of their radiation pattern. Furthermore, dipole antennas may be manually adjusted, this feature may be beneficial when the transmitter is located at crowded spaces and transmission needs to be optimized.

What is claimed is:

1. A method for transmitting wireless power, the method comprising:
    transmitting, by a first set of antennas of a transmitter, a first set of power waves forming a first constructive interference pattern in proximity to a location of a first receiver;
    simultaneously transmitting, by a second set of antennas of the transmitter, a second set of power waves forming a second constructive interference pattern in proximity to a location of a second receiver;
    receiving, by a communications component of the transmitter, a first communication signal from the first receiver and a second communication signal from the second receiver; and
    adjusting, by a controller of the transmitter, at least one of the first set of antennas and the second set of antennas such that the power waves of at least one of the first and second sets of power waves are transmitted to a new location of at least one of the first and second receivers indicated by the first and second communications signals, while transmitting at least one power wave from at least one antenna of the transmitter.

2. The method of claim 1, further comprising:
    forming, by the transmitter, a controlled destructive interference pattern based on the power waves, wherein the transmitter comprises an antenna array comprising the first and second set of antennas;
    forming, by the transmitter, a defined area based on the destructive pattern.

3. The method of claim 1, wherein the transmitter comprises a flat panel antenna array comprising a number of antennas ranging from 64 to 256 antennas distributed in an equally spaced grid.

4. The method of claim 3, wherein at least one of a number and a type of antennas in the array corresponds to at least one of a predetermined desired range and a power transmission capability of the transmitter so an increase in a value of the number corresponds to at least one of a wider range and a higher power delivery associated with the constructive interference pattern.

5. The method of claim 1, wherein the first and second set of antennas include at least one of a flat antenna, a patch antenna, and a dipole antenna.

6. A system for transmitting wireless power, the system comprising:
a first device comprising a controller, a transmitter coupled to the controller, a communications component coupled to the controller, and a plurality of antennas coupled to the transmitter,
wherein the controller is programmed to:
control the transmitter so a first set of the antennas transmit a first set of power waves to generate a first constructive interference pattern so a second device is able to be charged via the first constructive interference pattern based on the second device being positioned in proximity of the first constructive interference pattern,
control the transmitter so a second set of the antennas simultaneously transmit a second set of power waves to generate a second constructive interference pattern so a third device is able to be charged via the second constructive interference pattern based on the third device being positioned in proximity of the second constructive interference pattern,
wherein the communications component is configured to receive a first communication signal from the second device and a second communication signal from the third device, and
wherein the controller is further programmed to control at least one of the first set of antennas and the second set of antennas of the transmitter to adjust the power waves of at least one of the first and second sets of power waves to transmit to a new location of at least one of the second and third devices indicated by at least one of first and second communications signals, while transmitting at least one power wave from at least one antenna of the transmitter.

7. The system of claim 6, wherein the first constructive interference defines a first pocket of energy and a the second constructive interference pattern defines a second pocket of energy.

8. The system of claim 6, wherein the second device comprises an antenna configured to interface with the first constructive interference pattern so the second device is able to be charged and wherein the third device comprises an antenna configured to interface with the second constructive interference pattern so the third device is able to be charged.

9. The system of claim 6, wherein the plurality of antennas are arranged in an array and the orientation of the array is optimized for maximum efficiency.

10. The system of claim 6, wherein the plurality of antennas are arranged in an array comprising 64 to 256 antennas distributed in an equally spaced grid so that the first constructive interference pattern is better configured for the second device and the second constructive interference pattern is better configured for the third device.

11. A system for transmitting wireless power, the system comprising:
a first device comprising a controller, a transmitter coupled to the controller, and a plurality of antennas coupled to the transmitter,
wherein the controller is programmed to:
control the transmitter so a first set of antennas transmit a first set of power waves forming a first constructive interference pattern in proximity to a second device;
simultaneously, control the transmitter so a second set of antennas transmit a second set of power waves forming a second constructive interference pattern in proximity to a third device,
wherein each of the second device and the third device comprises a receiver and an antenna coupled to the receiver, wherein the second device and the third device are each configured to be charged via each of the respective antennas engaging the first and the second constructive interference pattern respectively;
a computer configured to communicate with the first device, the second device, and the third device so the computer is able to determine a new location of at least one of the second device and the third device; and
wherein the controller is further programmed to control at least one of the first set of antennas and the second set of antennas of the transmitter to adjust the power waves of at least one of the first and second sets of power waves to transmit to the new location of at least one of the second and third devices, while transmitting at least one power wave from at least one antenna of the transmitter.

12. The system of claim 11, wherein the first device is configured to form a controlled destructive interference pattern based on the power waves, wherein the first device comprises an array comprising the antennas, wherein the first device is configured to form a defined area lacking a constructive interference pattern based on the destructive pattern, wherein the array is at least a 8×8 grid of antenna elements distributed in an equally spaced grid.

13. The system of claim 11, wherein the antennas are arranged in an array, the array is at least a 16×16 grid of antenna elements distributed in an equally spaced grid.

14. The system of claim 11, wherein a number of the antennas is optimized for at least one of a transmission range and a transmission power.

15. The system of claim 11, wherein at least a portion of the antennas is arranged in at least one of a circular pattern and a polygon configuration.

16. The system of claim 11, wherein the antennas operate in a frequency band of at least one of about 900 MHz, about 2.5 GHz, and about 5.8 GHz.

17. The system of claim 11, wherein at least one of the antennas comprises a polarization comprising at least one of a vertical polarization, a horizontal polarization, a circular polarization, a left hand polarization, and a right hand polarization.

18. The system of claim 11, wherein the antennas operate as at least one of a single array, a double array, and a quad array.

19. The system of claim 11, wherein the antennas are arranged in a pair array where a top half of the antennas operates at about a 5.8 GHz band and a bottom half of the array operates at a about 2.4 GHz band, wherein at least one of such operation is driven via the transmitter and controlled via the controller.

20. The system of claim 11, wherein the controller dynamically adjusts the constructive interference pattern forming process via the antennas to regulate charging of the second device.

* * * * *